United States Patent
Mao et al.

(10) Patent No.: US 9,455,580 B2
(45) Date of Patent: Sep. 27, 2016

(54) BATTERY MANAGEMENT SYSTEM AND METHOD

(71) Applicant: General Electric Company, Schenectady, NY (US)

(72) Inventors: Saijun Mao, Shanghai (CN); Huiqing Wu, Shanghai (CN); Herman Lucas Norbert Wiegman, Niskayuna, NY (US); Qunjian Huang, Shanghai (CN); Ying Mei, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 177 days.

(21) Appl. No.: 14/321,935

(22) Filed: Jul. 2, 2014

(65) Prior Publication Data

US 2015/0035490 A1 Feb. 5, 2015

(30) Foreign Application Priority Data

Aug. 1, 2013 (CN) .......................... 2013 1 0331899

(51) Int. Cl.
*H02J 7/00* (2006.01)
(52) U.S. Cl.
CPC ............ *H02J 7/0014* (2013.01); *H02J 7/0016* (2013.01)
(58) Field of Classification Search
CPC .................................................. H02J 7/0014
USPC ................................................. 320/118, 119
See application file for complete search history.

(56) References Cited

U.S. PATENT DOCUMENTS 5,659,237 A * 8/1997 Divan .................. H02J 7/0018
320/119

5,982,143 A * 11/1999 Stuart ................. H01M 10/441
320/119

(Continued)

FOREIGN PATENT DOCUMENTS

| CN | 102420447 A | 4/2012 |
|---|---|---|
| CN | 102468674 A | 5/2012 |

(Continued)

OTHER PUBLICATIONS

Yarlagadda et al., "A Battery Management System Using an Active Charge Equalization Technique Based on DC-DC Converter Topology", Thesis, Master of Science in Engineering, University of Akron, pp. 1-143, Aug. 2011.

(Continued)

*Primary Examiner* — M'Baye Diao
(74) *Attorney, Agent, or Firm* — Meagher Emanuel Laks Goldberg & Liao, LLP (57) ABSTRACT

A battery system has a battery module including a number M of series-connected batteries. The battery system is further provided with a number N (1<N≤M) of charge equalizers, each of which once connected to a battery, causes the battery to be charged and/or discharged to achieve charge equalization. A control device is configured to determine for each battery if it requires charge equalization based on a state of charge (SOC) of the battery, compare a number L of the batteries that require charge equalization and the number M, and based on the comparison result, cause the battery system to be shut down, or the one or more batteries that require charge equalization to be connected to corresponding charge equalizers. A selective switch module is used for connecting the one or more batteries that require charge equalization to corresponding charge equalizers, respectively.

20 Claims, 6 Drawing Sheets

(56) References Cited

U.S. PATENT DOCUMENTS

| | | | | |
|---|---|---|---|---|
| 6,150,795 A * | 11/2000 | Kutkut | ............... | H02J 7/0018 320/118 |
| 6,841,971 B1 * | 1/2005 | Spee | ............... | H01M 10/44 320/119 |
| 8,089,249 B2 | 1/2012 | Zhang et al. | | |
| 8,253,378 B2 | 8/2012 | Lee et al. | | |
| 8,643,334 B2 * | 2/2014 | Kuo | ............... | H02J 7/0018 320/116 |
| 8,952,662 B2 * | 2/2015 | Ma | ............... | H02J 7/0016 320/116 |
| 9,142,979 B2 * | 9/2015 | Tsai | ............... | H02J 7/0042 |
| 9,225,191 B2 * | 12/2015 | Drobnik | ............... | H02J 7/007 |
| 2005/0077875 A1 * | 4/2005 | Bohley | ............... | H02J 7/0016 320/119 |
| 2008/0233469 A1 | 9/2008 | Drozdz et al. | | |
| 2011/0089898 A1 | 4/2011 | Lee et al. | | |
| 2011/0193528 A1 | 8/2011 | Huggins | | |
| 2011/0285352 A1 | 11/2011 | Lim et al. | | |
| 2012/0025784 A1 | 2/2012 | Rana | | |
| 2012/0032638 A1 | 2/2012 | Jung | | |
| 2012/0119709 A1 | 5/2012 | Mull et al. | | |
| 2012/0217806 A1 * | 8/2012 | Heidenreich | ............... | H02J 7/0019 307/48 |
| 2012/0286733 A1 * | 11/2012 | Chang | ............... | H02J 7/0018 320/118 |
| 2013/0015817 A1 | 1/2013 | Wang et al. | | |
| 2013/0049698 A1 | 2/2013 | Jung | | |
| 2013/0057219 A1 * | 3/2013 | Sakata | ............... | B60L 11/1866 320/118 |
| 2013/0214733 A1 * | 8/2013 | Liang | ............... | H02J 7/0014 320/108 |
| 2014/0266050 A1 * | 9/2014 | Biskup | ............... | H02J 7/0016 320/118 |

FOREIGN PATENT DOCUMENTS

| | | |
|---|---|---|
| CN | 102664433 A | 9/2012 |
| CN | 102882242 A | 1/2013 |
| WO | 2010076767 A1 | 7/2010 |

OTHER PUBLICATIONS

Einhorn et al., "Charge Balancing of Serially Connected Lithium-Ion Battery Cells in Electric Vehicles", e & i, Elektrotechnik and Informationstechnik, pp. 167-173, vol. 129, Issue 3, May 2012.

Unofficial English Translation of Chinese Office Action issued in connection with corresponding CN Application No. 201310331899.0 on Mar. 2, 2016.

* cited by examiner

BATTERY MANAGEMENT SYSTEM AND METHOD

BACKGROUND

Batteries are the most common electrical energy storage devices for electric vehicle, medical instruments, uninterruptible power supply, and other industrial applications. In use, when a potential higher than a basic potential of a battery is needed, it is common to use a plurality of batteries which are connected in series. However, even though the batteries are produced with the same structure via a typical production method using the same anode, cathode and electrolyte material, a difference in charging or discharging (and self-discharging) characteristics exists between each of the batteries connected in series. Thus there is a potential difference between the series-connected batteries, which may cause a problem of unbalanced charging. For example, as the potentials of the series-connected batteries are different from each other, some batteries may reach a prescribed voltage when some other batteries do not reach the prescribed voltage, and therefore an overcharge or undercharge problem or even both overcharge and undercharge problems may be caused during charging the series-connected battery string.

An overcharged battery may have high risk of explosion if the chemistry of the battery cannot withstand overcharged state, whereas an undercharged battery may reduce the life cycle of the series-connected battery string. Therefore, it is needed to address the unbalanced charging problem for the series connected battery string. A common method is to use charge equalization devices to achieve charge equalization for the series-connected battery string.

Figure 1:
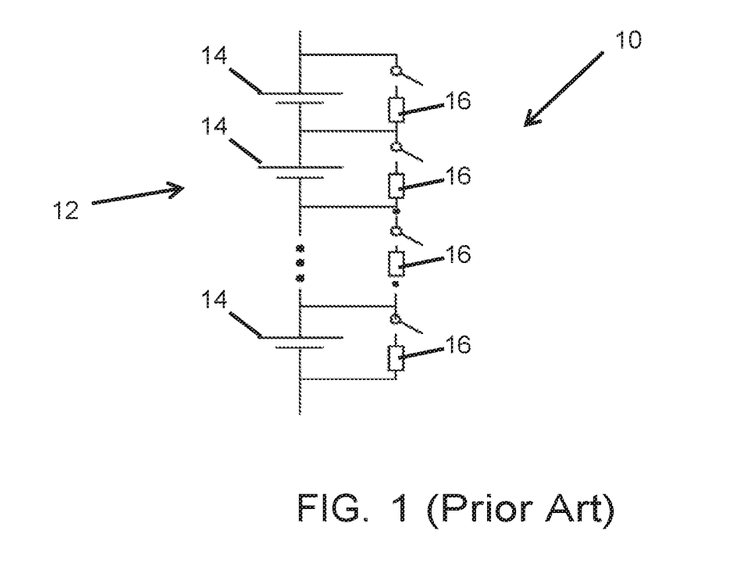
FIG. 1 is a schematic view showing a prior approach for achieving charge equalization for a series-connected battery string.

A conventional passive approach 10 for achieving charge equalization is represented in FIG. 1. In the illustrated series-connected battery string 12, each battery 14 is connected with a parallel resistor 16, which assists to achieve charge equalization for each battery 14. It is a simple low cost way, but it suffers high energy loss and heat dissipation. Moreover, the charge equalizer capability is limited for batteries of high current.

Figure 2:
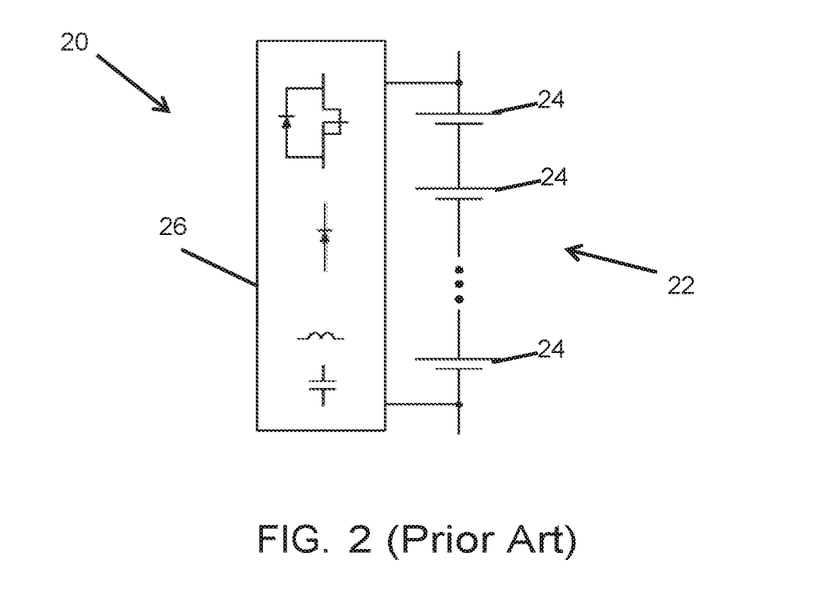
FIG. 2 is a schematic view showing another prior approach for achieving charge equalization for a series-connected battery string.

A conventional active approach 20 for achieving charge equalization is represented in FIG. 2. In the illustrated series-connected battery string 22, each battery 24 is provided with a power electronics circuit 26 for achieving charge equalization. The power electronics circuit 26 may be a combination of switches, diodes, inductors, and/or capacitors. It is a method of high energy efficiency, and it is able to achieve charge equalization for batteries of high current. However, as the individual power electronics circuit for achieving charge equalization is high in cost and large in size, there are problems in both implementation cost and size.

BRIEF DESCRIPTION

In accordance with an embodiment disclosed herein, a battery system is provided. The battery system has a battery module including a number M of series-connected batteries, and is further provided with a number N ($1<N\leq M$) of charge equalizers, each of which once connected to a battery, causes the battery to be charged and/or discharged to achieve charge equalization. A control device is configured to determine for each battery if it requires charge equalization based on a state of charge (SOC) of the battery, compare a number L of the batteries that require charge equalization and the number M, and based on the comparison result, cause the battery system to be shut down, or the one or more batteries that require charge equalization to be connected to corresponding charge equalizers. A selective switch module is used for connecting the one or more batteries that require charge equalization to corresponding charge equalizers, respectively.

In accordance with another embodiment disclosed herein, a method is provided. In the method, a battery system including a number M of batteries connected in series and a number N of charge equalizers wherein $1<N\leq M$ is provided. It is determined for each battery if it requires charge equalization based on a state of charge (SOC) of the battery. The method further comprises comparing a number L of batteries that require charge equalization and the number N of the charge equalizers, and based on the comparison result, shutting down the battery system, or connecting the L batteries that require charge equalization to L charge equalizers to cause the batteries to be charged and/or discharged for achieving charge equalization.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the invention provide a cost effective and high performance charge equalization solution for series-connected batteries. According to the embodiments of the invention, a battery module including a number M ($M\geq 2$) of batteries connected in series is provided. A number N of charge equalizers are provided to achieve charge equalization for the M series-connected batteries in the battery module. Each of the charge equalizers, once connected to a battery in the battery module, causes the battery to be charged and/or discharged to achieve charge equalization. The number N of the charge equalizers is greater than 1 and not greater than the number M of batteries ($1<N\leq M$). There is a selective switch module for selectively connecting the batteries to the charge equalizers. Under the control of a control device, the selective switch module is able to connect the one or more batteries that require charge equalization to corresponding charge equalizer(s), respectively. In such a way, the battery module can achieve a charge balance with the charge equalizers. Particularly, the number N of the charge equalizers is greater than 1 and smaller than the number M of batteries (1<N<M), such that battery module can achieve a charge balance with charge equalizers less than the series-connected batteries.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. Moreover, the terms "coupled" and "connected" are not intended to distinguish between a direct or indirect coupling/connection between two components. Rather, such components may be directly or indirectly coupled/connected unless otherwise indicated.

Figure 3:
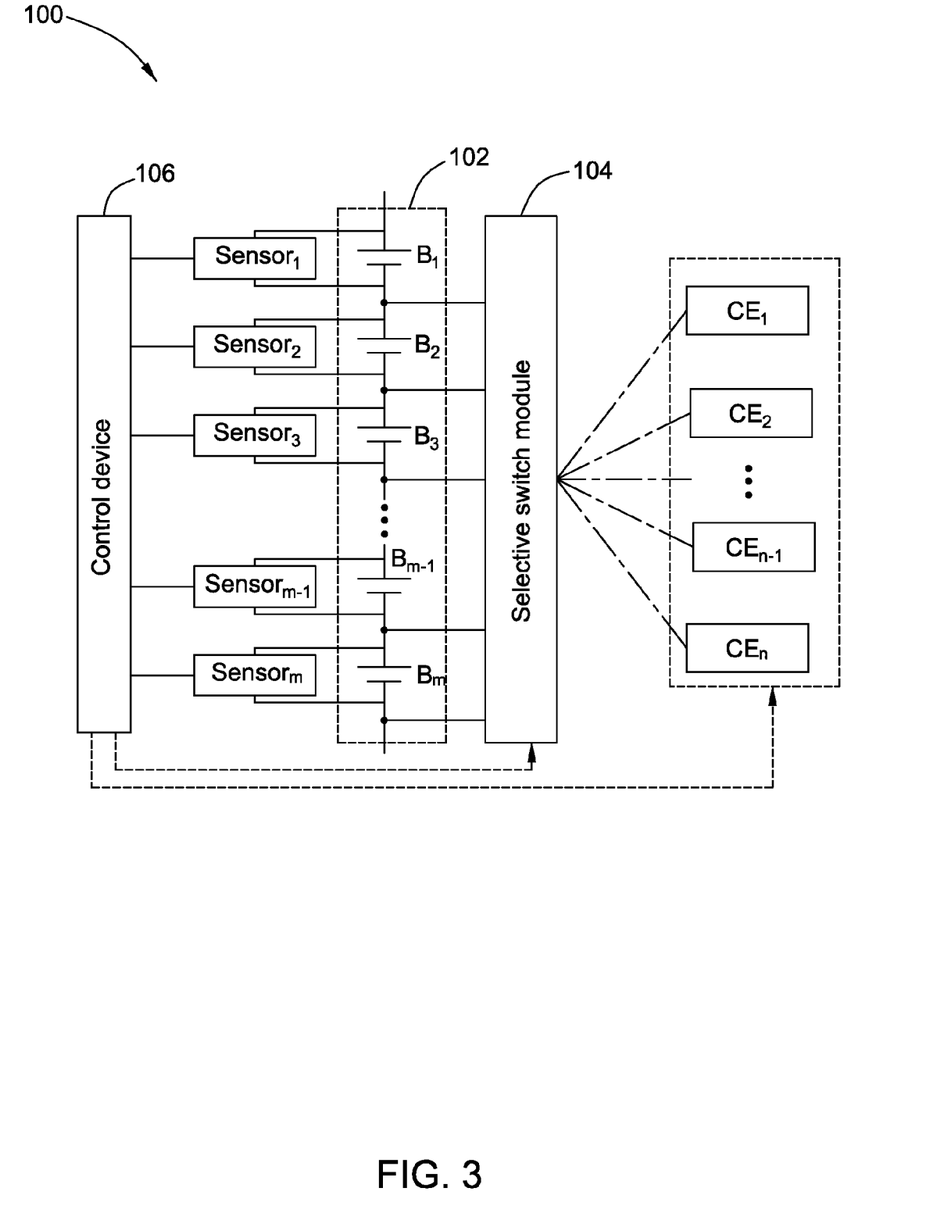
FIG. 3 is a diagram showing an example of a battery system according to one embodiment of the present invention.

Referring to FIG. 3, a battery system 100 includes a battery module 102 having a number M of batteries ($B_1$, $B_2$, $B_3$, . . . , $B_{m-1}$, $B_m$) connected in series. Each of the M batteries is coupled with a sensor for measuring voltage of the battery. A number N of charge equalizers ($CE_1$, $CE_2$, . . . , $CE_{n-1}$, $CE_n$) are provided to achieve charge equalization for the battery module 102, wherein 1<N≤M. A selective switch module 104 is provided to detachably and selectively connect one or more of the batteries to corresponding charge equalizers. There is a control device 106 for controlling the switch module 104 and the charge equalizers. The control device 106 communicates with the sensors for all the batteries, such that it can acquire the measurement data from the sensors, calculate a state of charge (SOC) of each battery, and thus determine for each battery if the battery requires charge equalization based on the SOC of the battery. By determining for each battery if it requires charge equalization, it can be identified which batteries require charge equalization as well as how many batteries require charge equalization. In some embodiments, the control device is configured to determine a battery as requiring charge equalization if the SOC of the battery is not within a predefined SOC range. For example, if a SOC predefined range is from 45% to 65%, a battery with a SOC not within the range from 45% to 65% is determined as requiring charge equalization.

As used herein, the "state of charge (SOC)" refers to the amount of energy left in a battery in compare with the energy it had when it was full, which can give the user an indication of how much longer a battery will continue to perform before it needs recharging. There are several ways to estimate the SOC of a battery. Most commonly used estimation methods include ampere-hour (Ah) counting methods, open circuit voltage (OCV) methods and Kalman filtering methods. In some embodiments, the voltage of the battery, measured by the sensor coupled to the battery, is used as the basis for calculating SOC through an OCV method.

In some embodiments, the control device 106 is further configured to compare a number L of batteries that require charge equalization and the number N of charge equalizers to determine whether L>N, and respond to the comparison result accordingly. In some specific embodiments, the control device 106 is configured to cause the battery system to be shut down if L>N, or cause the batteries that require charge equalization to be connected to corresponding charge equalizers respectively if L≤N.

In some embodiments, if L≤N, the control device 106 may be further configured to rank the L batteries that require charge equalization in a descending order of how much they require charge equalization in order to connect them to the L charge equalizers in the descending order.

In some specific embodiments, the L batteries that require charge equalization are ranked in a descending order of the degree to which its SOC varies from the predefined SOC range. For example, if a predefined SOC range is from 40% to 70%, the batteries that require charge equalization can be ranked by the degree to which its SOC varies from the endpoint of the range, 40% or 70%. For example, as for batteries with SOC of 25%, 30%, 38%, 73%, 78%, 83%, respectively, the battery with a SOC of 25% (15% less than 40%) is determined as the battery that requires charge equalization most, then the battery with a SOC of 83% (13% more than 70%), the battery with a SOC of 30% (10% less than 40%), the battery with a SOC of 78% (8% more than 70%), the battery with a SOC of 73% (3% more than 70%), and lastly the battery with a SOC of 38% (2% less than 40%).

As for each charge equalizer connected with a battery that requires charge equalization, it can be determined through the control device 106 to charge or/and discharge the battery or not, according to the SOC of the battery. Properly charging or/and discharging a battery in the battery module can achieve charge equalization for the battery.

The battery may comprise one or more parallel connected battery cells. In some embodiments, the battery is a single battery cell. In some embodiments, the battery is a collection of parallel connected battery cells.

The control device 106 may be any device capable of achieving the functions as described above. In some embodiments, the control device 106 may comprise one or more selected from the group consisting of computers, processors, microcontrollers, microcomputers, programmable logic controllers and programmable circuits. Some examples of suitable control devices include but are not limited to microprocessors, application specific integrated circuits (ASIC), digital signal processors (DSP), field programmable gate arrays (FPGA) and their combinations.

The charge equalizer may be a circuit capable of equalizing the charge on the series connected batteries in a battery string. In some embodiments, the charge equalizer comprises one or more active semiconductor switches and one or more passive devices. Examples of active semiconductor switches suitable for use in the charge equalizer include but are not limited to field effect transistors, bipolar junction transistors (BJT), relays and diodes. Examples of passive devices suitable for use in the charge equalizer include but are not limited to inductors, transformers and capacitors. The switch module 104 may comprise one or more devices selected from the group consisting of metal-oxide power semiconductor transistors, relays, BJTs, metal-oxide-semiconductor field-effect transistors (MOSFET), and insulated gate bipolar transistors (IGBT).

Figure 4:
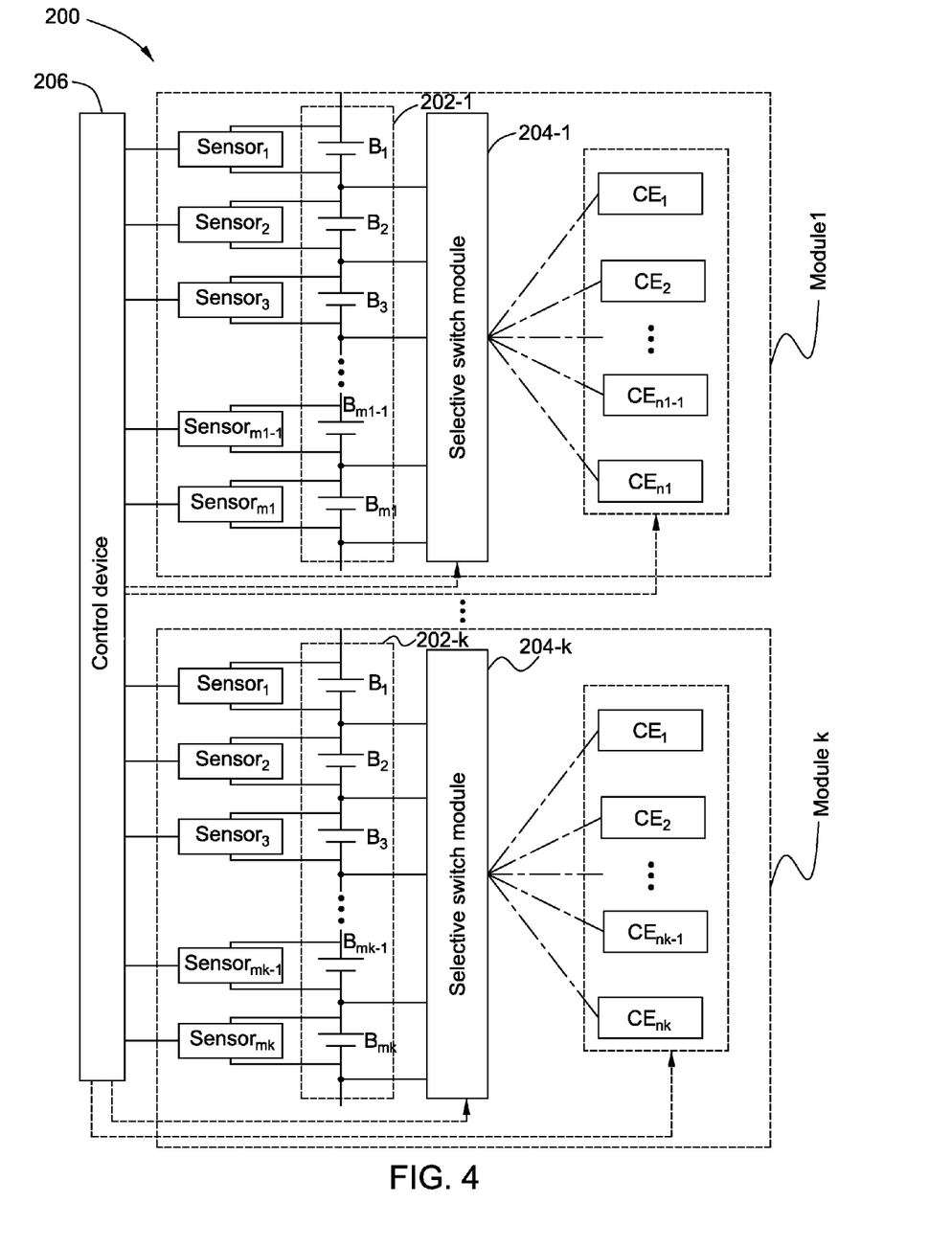
FIG. 4 is a diagram showing an example of a battery system according to another embodiment of the present invention.

In some embodiments, a battery system includes at least two said battery modules, each of which is provided with an appropriate number of sensors, an appropriate number of charge equalizers and a selective switch module. For example, as illustrated in FIG. 4, a battery system 200 includes K (K≥2) battery modules 102-1, . . . , 102-k. The battery module 102-1 includes M1 batteries ($B_1$, $B_2$, $B_3$, . . . , $B_{m1-1}$, $B_{m1}$) connected in series and each coupled with a sensor, and is further provided with N1 charge equalizers ($CE_1$, $CE_2$, . . . , $CE_{n1-1}$, $CE_{n1}$) wherein 1<N1≤M1, and a selective switch module 204-1. The battery module 102-k includes Mk batteries ($B_1$, $B_2$, $B_3$, . . . , $B_{mk-1}$, $B_{mk}$) connected in series and each coupled with a sensor, and is further provided with Nk charge equalizers ($CE_1$, $CE_2, \ldots, CE_{nk-1}, CE_{nk}$) wherein $1<Nk \leq Mk$, and a selective switch module 204-$k$. As to a certain battery module 102-$i$ ($1<i<k$) (not shown) of the K battery modules, it may include Mi batteries ($B_1, B_2, B_3, \ldots, B_{mi-1}, B_{mi}$) connected in series and each coupled with a sensor, and may be further provided with Ni charge equalizers ($CE_1, CE_2, \ldots, CE_{ni-1}, CE_{ni}$) wherein $1<Ni \leq Mi$, and a selective switch module 204-$i$. In some embodiments, N1, ..., Ni, ..., Nk may be numbers different from each other. In some embodiments, at least some of N1, ..., Ni, ..., Nk are a same number. In particular, all of N1, ..., Ni, ..., Nk may be a same number. The battery system 200 also has a control device 206 as described above. With the control device 20, each of the battery modules 102-1, ..., 102-$k$ can achieve charge equalization through its corresponding charge equalizers.

Figure 5:
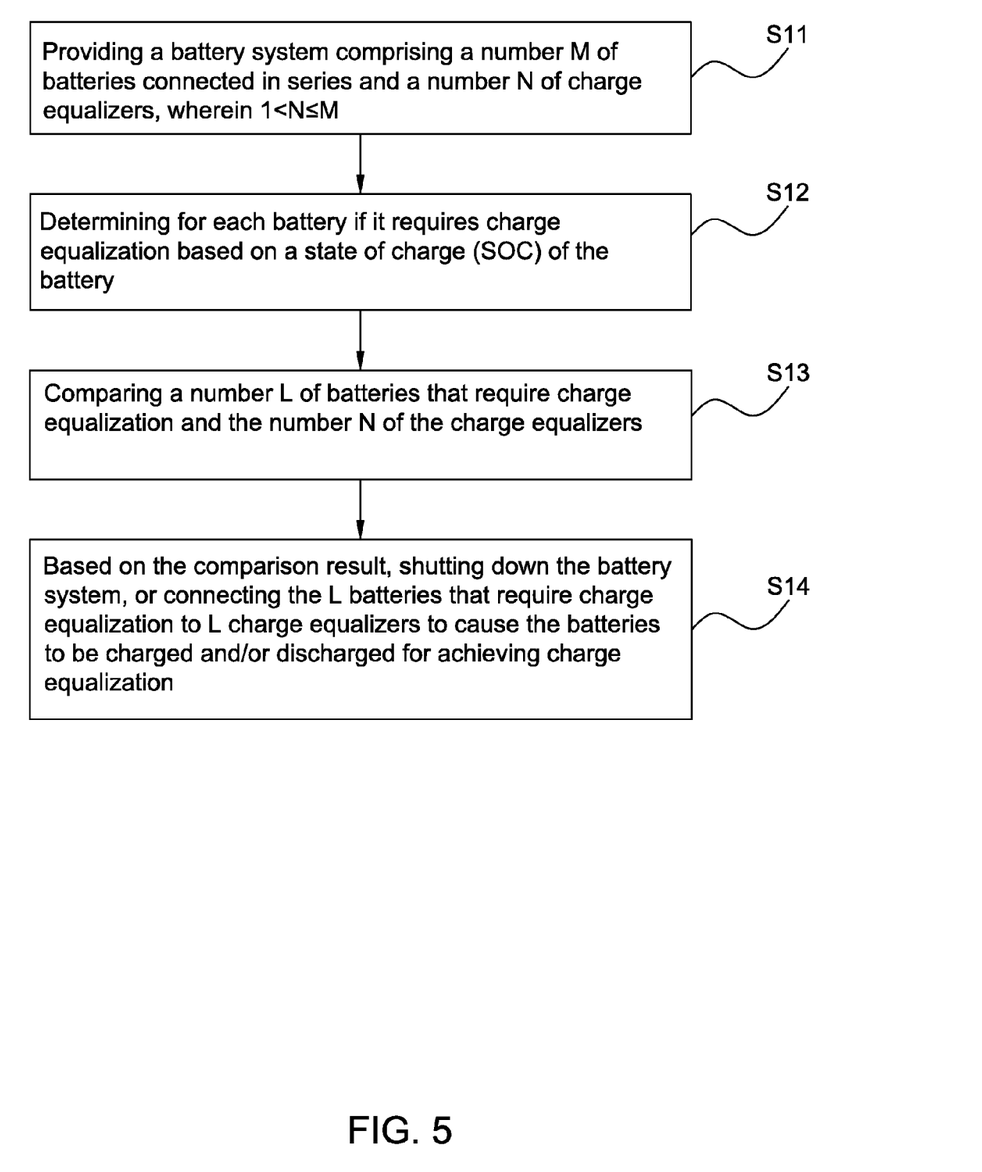
FIG. 5 is a flow diagram showing a battery management method according to one embodiment of the present invention.

Embodiments of the invention also provide a battery management method for the battery system as described above. Referring to FIG. 5, a battery system comprising a number M of batteries connected in series and a number N of charge equalizers wherein $1<N \leq M$ is provided in S11. It is determined for each battery if it requires charge equalization based on the SOC of the battery in S12. A number L of batteries that require charge equalization is compared with the number N of the charge equalizers in S13. Based on the comparison result, the battery system is shut down or the L batteries are connected to L charge equalizers to cause the L batteries to be charged and/or discharged to achieve charge equalization in S14.

In some embodiments, in S12, a battery is determined as requiring charge equalization if the SOC of the battery is not within a predefined range.

Figure 6:
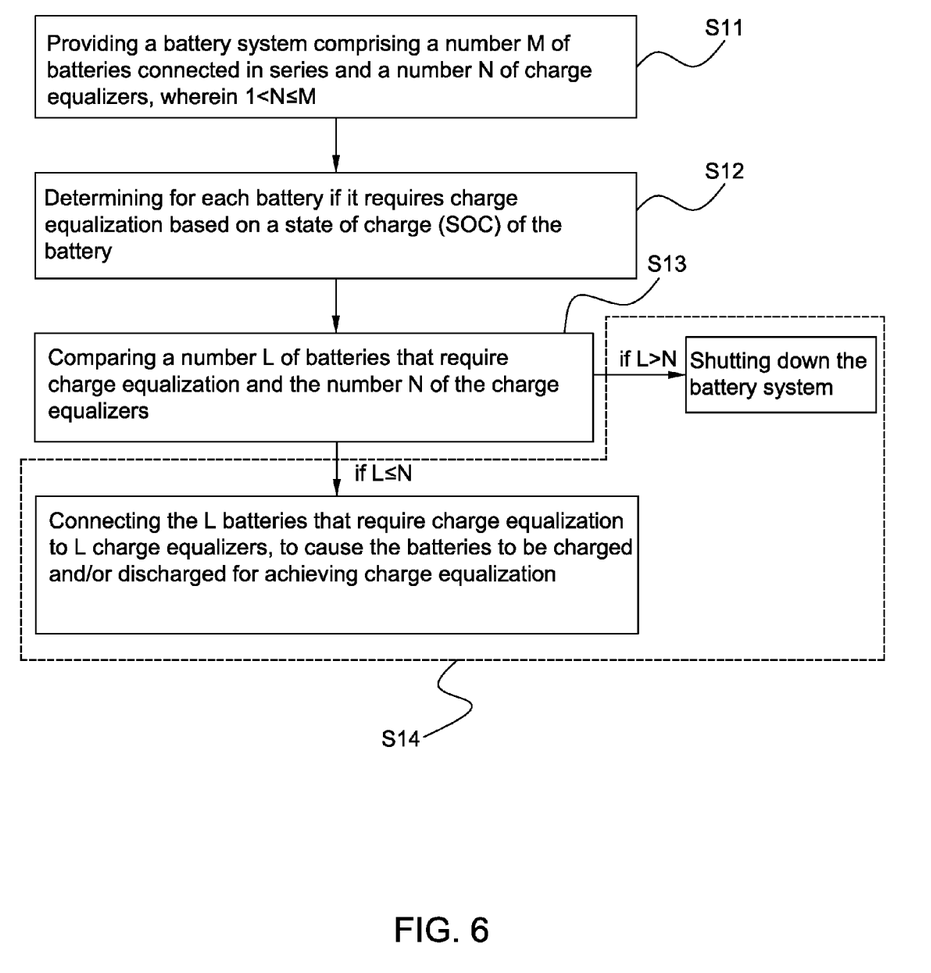
FIG. 6 is a flow diagram showing a specific embodiment of the battery management method of FIG. 5.

In some embodiments, as illustrated in FIG. 6, in S14, the battery system is shut down if L>N, and the L batteries that require charge equalization are connected to L corresponding charge equalizers respectively if L≤N.

Figure 7:
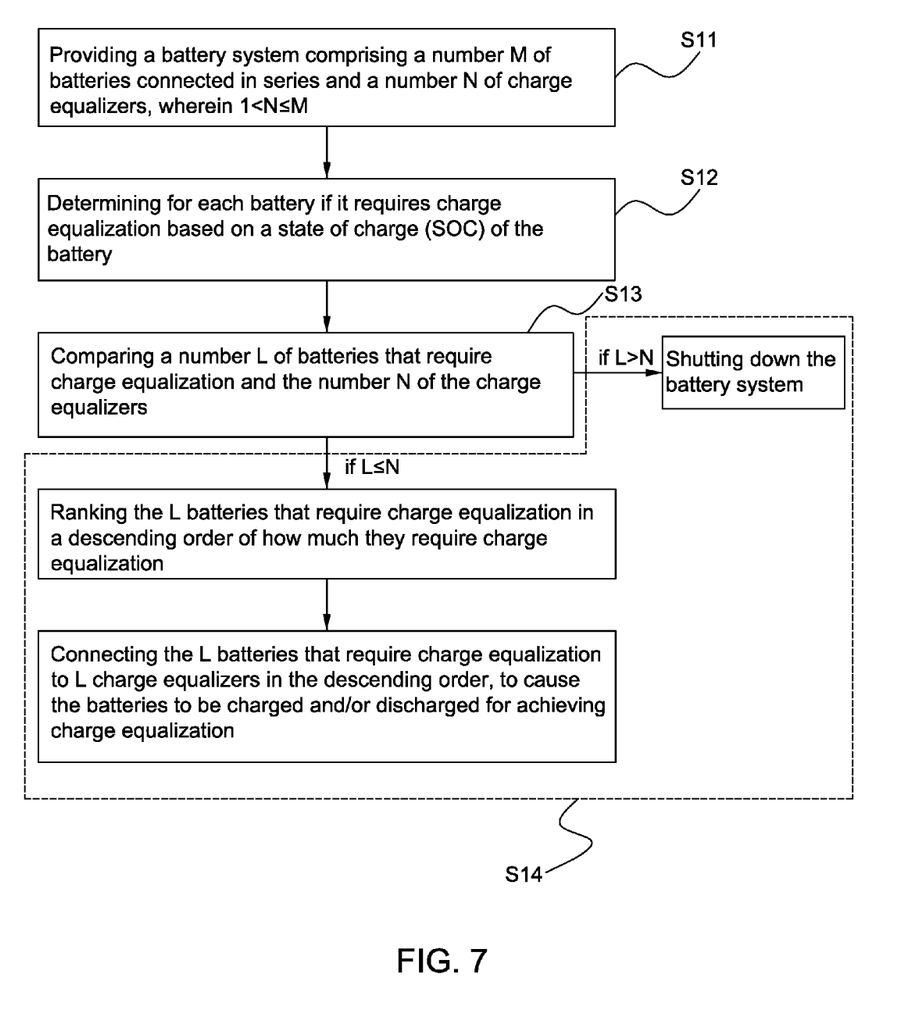
FIG. 7 is a flow diagram showing another specific embodiment of the battery management method of FIG. 5.

In some embodiments, as illustrated in FIG. 7, in S14, if L≤N, the L batteries that require charge equalization are ranked in a descending order of how much they require charge equalization, and thereby they are connected to L charge equalizers in the descending order.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

The invention claimed is:

1. A battery system, comprising:
   a number M of battery cells connected in series;
   a number N of charge equalizers, each of which, once connected to a battery cell, causes the battery cell to be charged and/or discharged for achieving charge equalization, wherein $1<N \leq M$;
   a control device configured to:
      determine if one or more battery cells require charge equalization based on a state of charge (SOC) of each battery cell,
      compare a number L of the battery cells that require charge equalization and the number N of charge equalizers, and
      based on the comparison result, cause the battery system to be shut down, or cause the one or more battery cells that require charge equalization to be connected to corresponding charge equalizers; and
   a selective switch module for connecting the one or more battery cells that require charge equalization to corresponding charge equalizers, respectively.

2. The battery system of claim 1, wherein a number of the battery cells are connected in parallel.

3. The battery system of claim 1, wherein each of the battery cells is coupled with a sensor for measuring voltage across each battery cell.

4. The battery system of claim 1, wherein the control device is configured to determine that a battery cell requires charge equalization if the SOC of the battery cell is not within a predefined range.

5. The battery system of claim 1, wherein the control device is configured to cause the battery system to be shut down if L>N and cause the battery cells that require charge equalization to be connected to corresponding charge equalizers if L≤N.

6. The battery system of claim 5, wherein the control device is configured to rank the L battery cells in a descending order of how much they require charge equalization and connect the L battery cells to the charge equalizers in the descending order, if L≤N.

7. The battery system of claim 1, wherein the charge equalizer comprises one or more active semiconductor switches, and one or more passive devices.

8. The battery system of claim 1, wherein the switch module comprises one or more selected from the group consisting of metal-oxide power semiconductor transistors, bipolar junction transistors, metal-oxide-semiconductor field-effect transistors, insulated gate bipolar transistors, and relays.

9. The battery system of claim 1, wherein the control device is selected from the group consisting of microprocessors, application specific integrated circuits, digital signal processors, field programmable gate arrays and their combinations.

10. The battery system of claim 1, wherein the switch module comprises one or more selected from the group consisting of metal-oxide power semiconductor transistors, bipolar junction transistors, metal-oxide-semiconductor field-effect transistors, insulated gate bipolar transistors, and relays.

11. The battery system of claim 1, wherein the control device is selected from the group consisting of microprocessors, application specific integrated circuits, digital signal processors, field programmable gate arrays and their combinations.

12. A method comprising:
   providing a number M of battery cells connected in series and a number N of charge equalizers, wherein $1<N \leq M$; and
   configuring a control unit to:
      determine if one or more battery cells require charge equalization based on a state of charge (SOC) of each battery cell;
      compare a number L of battery cells that require charge equalization and the number N of the charge equalizers; and
      based on the comparison result, shut down the battery cells, or connect the L battery cells that require charge equalization to L charge equalizers to cause the battery cells to be charged and/or discharged for achieving charge equalization.

13. The method of claim 12, wherein a battery cell is determined as requiring charge equalization if the SOC of the battery cell is not within a predefined range.

14. The method of claim 12, wherein the control unit is further configured to shut down the battery cells if L>N, and connect L battery cells that require charge equalization to L charge equalizers, respectively, if L<N.

15. The method of claim 14, wherein if L≤N, further comprising configuring the control unit to rank the L battery cells that require charge equalization in a descending order of how much they require charge equalization, and the L battery cells that require charge equalization are connected to L charge equalizers respectively in the descending order.

16. A battery system, comprising:
a number M of battery cells connected in series;
a number N of charge equalizers, each of which, once connected to a battery cell, causes the battery cell to be charged and/or discharged for achieving charge equalization, wherein $1<N\leq M$;
at least one selective switch module for connecting a battery cell that requires charge equalization to a charge equalizer; and
a control device configured to:
  determine if one or more battery cells require charge equalization based on a state of charge (SOC) of each battery cell,
  compare a number L of the battery cells that require charge equalization with the number N of charge equalizers,
  cause the battery system to be shut down if L>N, and
  cause the one or more battery cells that require charge equalization to be connected to corresponding charge equalizers if L≤N.

17. The battery system of claim 16, wherein a number of the battery cells are connected in parallel.

18. The battery system of claim 16, wherein each of the battery cells is coupled with a sensor for measuring voltage across each battery cell.

19. The battery system of claim 16, wherein the control device is configured to determine that a battery cell requires charge equalization if the SOC of the battery cell is not within a predefined range.

20. The battery system of claim 16, wherein the charge equalizer comprises one or more active semiconductor switches, and one or more passive devices.

* * * * *